(No Model.)

H. R. ZUBER.
PROCESS OF MANUFACTURING ARTIFICIAL STONE.

No. 391,830. Patented Oct. 30, 1888.

Witnesses:
H. S. Rohrer
Wm. W. Douglas

Inventor.
H. R. Zuber
by Schuyler Duryee
Attorney.

UNITED STATES PATENT OFFICE.

HEINRICH RUDOLPH ZUBER, OF BERLIN, GERMANY.

PROCESS OF MANUFACTURING ARTIFICIAL STONE.

SPECIFICATION forming part of Letters Patent No. 391,830, dated October 30, 1888.

Application filed November 12, 1886. Serial No. 218,739. (No model.) Patented in Germany October 30, 1883, No. 27,727, and in Austria-Hungary February 21, 1885.

*To all whom it may concern:*

Be it known that I, HEINRICH RUDOLPH ZUBER, of Berlin, in the Kingdom of Prussia and German Empire, have invented a new and useful Improvement in Manufacturing Artificial Stone Free of Air, of which the following is a specification, reference being had therein to the accompanying drawings, (no patents being obtained by me anywhere for this invention, save in Germany, No. 27,727, dated October 30, 1883, and in Austria-Hungary, February 21, 1885.)

My invention relates to the manufacturing of artificial stones and to the apparatus used for that purpose.

Figure 1:
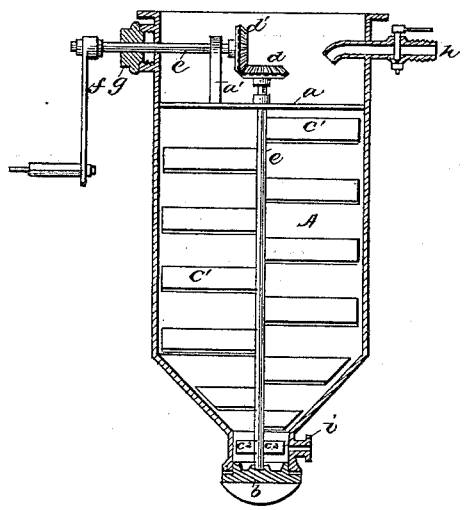
Figure 2:
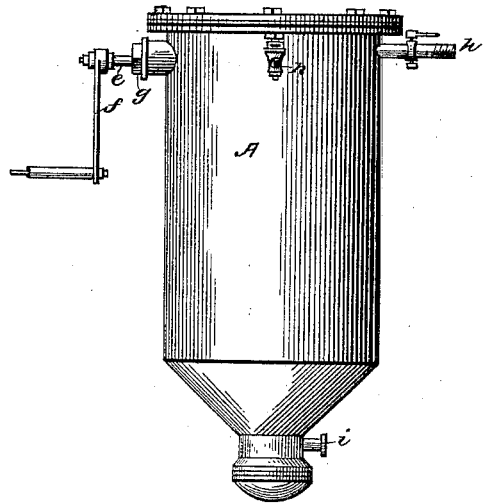
Figure 3:
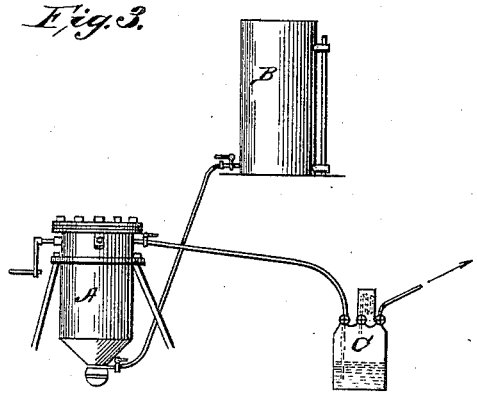

The apparatus is represented in the accompanying drawings as follows:

Figure 1 is a vertical section. Fig. 2 shows a view of the mixing-vessel. Fig. 3 shows a view of the entire arrangement.

In the present methods of manufacturing artificial stones pure quartz, gravel, or sand, with lime silicates as a cement, hydraulic lime, &c., are generally mixed with water. This mixture is first moistened with a little water and stamped in the molds. More water is then added, and it is stirred up into a kind of pulp, and finally cast in molds. Another method is to treat it as mortar and to build it up with the bricks and other stones. Stones made in this way are, however, not able to resist the influence of the weather, and are therefore not serviceable for the outer walls of a building. In mixing up the component parts of these stones the air forms thousands of bubbles, both large and small, in the material, and they cannot be expelled without disturbing the cementing process. The water that is used contains besides a considerable amount of air, which remains in the material, and after the water has been combined by the lime and clay silicates and has formed hydrates it forms microscopically fine channels between the air bubbles in the material. Rain-water and other vapors are sucked up by these capillary-like channels and evaporate again when the weather becomes warmer. The occurrences are different, however, when frost sets in. The water freezes then and expands with great force. It enlarges the fine channels in the material almost imperceptibly at first; but with each recurrence of the frost they widen, till, finally, flaws in the stones are visible. When it has gone on so far, the crumbling process is accelerated by the same causes till the stones gradually molder away. These drawbacks are completely removed by the new methods of manufacturing artificial stones. The specific weight of the latter is almost equal to that of the natural sandstone in this case.

The improvement in the method of manufacturing consists materially in the sucking up of the air out of the gravel (and cement) used for the purpose, and in mixing this gravel (cement) devoid of air with water or some other fluid under a vacuum. The water or other fluid mixed with the cement is previously rendered void of air or gases by boiling it or by some other means.

The method of manufacturing is as follows: The materials that are to be used—such as gravel, cement, &c.—are put into the apparatus A when quite dry. The latter is then closed hermetically and brought into connection with an air-pump by means of cock *h*. The air-pump sucks up all air contained in the material. In order to prevent particles of dust from getting into the pump a Woulfe apparatus is placed in the pipes that connect the apparatus A with the air-pump. The Woulfe apparatus is provided with a vacuum-gage for measuring the exhaustion and rarefying of the air. As soon as a sufficient vacuum has been produced in the apparatus A, the cock *h* is shut (turned off) and the cock *i* at the bottom of the apparatus A is opened, and the water, which is (has been) mixed with the color that the stone is to have, is allowed to run out of the reservoir B into the apparatus A. The air and gases contained in the water or other fluid that is to be mixed with the materials are removed from it prior to its being let into the apparatus A by boiling it or by some other means. The reservoir B is provided with a water-gage for controlling the quantity of water it delivers most exactly. Owing to the vacuum in the apparatus A, the water mingles quickly with the powdery materials. The stirrer contained in the apparatus is then set in motion by turning it to the right. It stirs the component parts up well and mixes them thoroughly. The cock attached to the top of the apparatus is then opened and air is admitted into the open space above the material. The closing contrivance attached to the under end of the apparatus is opened then and the pulp is allowed to run out into the molds, held beneath the opening. The emptying of the apparatus A is accelerated by turning the stirrer to the left. The stones, ocks, &c., thus produced are quite devoid . air, and therefore more solid, specifically heavier and harder than the stones produced by the methods used hitherto. When the cementing process is concluded and the stones have hardened, they do not allow water to penetrate, and are therefore not exposed to destruction by the influence of the weather on them.

The apparatus consists in a cylindrical vessel, A, which runs off conically and is provided at foot with an outlet-opening and at the upper end with a cross-bar, $a$, and trestle $a'$. The outlet opening is made air-tight by a closing contrivance, $b$, and by packing. In the cross-bar $a$ is a vertical shaft, $c$, which has in the small apparatus a standing bush (collar) in the closing contrivance $b$; but in the cross-bar a bush is constructed specially for it. The shaft $c$ is provided with a number of arms, $c'$, which are placed rather slanting on both sides of it and at an angle to each other, so that in a certain sense they operate like a screw on the material and in the mixing process, already mentioned, turn the component parts from top to bottom and bottom to top again. Quite at the bottom and just above the outlet-opening two straight arms, $c^2$, are attached to the shaft $c$. With the aid of them the component parts of the material are mixed up thoroughly. A shaft, $e$, which has its bushes in the side wall of the apparatus and in the trestle $a'$, is provided on the outside of the apparatus with a crank or strap-pulley, whereas on the inside a miter-wheel, $d'$, is wedged fast onto it. This miter-wheel $d'$ gears into a miter-wheel, $d$, fixed onto the fixed end of the shaft $c$. The shaft $e$ is shut off air-tight by the stuffing-box $g$ and by packing. On a level with the shaft $e$ there are the openings in the apparatus A for the cock. The top of the apparatus A is closed hermetically by means of a leather disk, a lid, and screws. At the bottom of the short cylindrical part of the vessel A, to which the closing contrivance $b$ is attached, there is another opening with a flange, $i$, for the inlet-cock, through which the fluid enters.

What I claim, and desire to secure by Letters Patent of the United States, is—

The process of making artificial stone, which consists, first, in placing the dry component parts—such as gravel, cement, &c.—in an apparatus that is hermetically closed; second, the exhausting of air therefrom; third, the mixing of the materials in vacuum with water, which may be colored; fourth, when the materials are thoroughly mixed placing the same in molds, all substantially as described.

In witness whereof I have hereunto set my hand in presence of two witnesses.

HEINRICH RUDOLPH ZUBER.

Witnesses:
M. W. MOORE,
B. ROI.